UNITED STATES PATENT OFFICE.

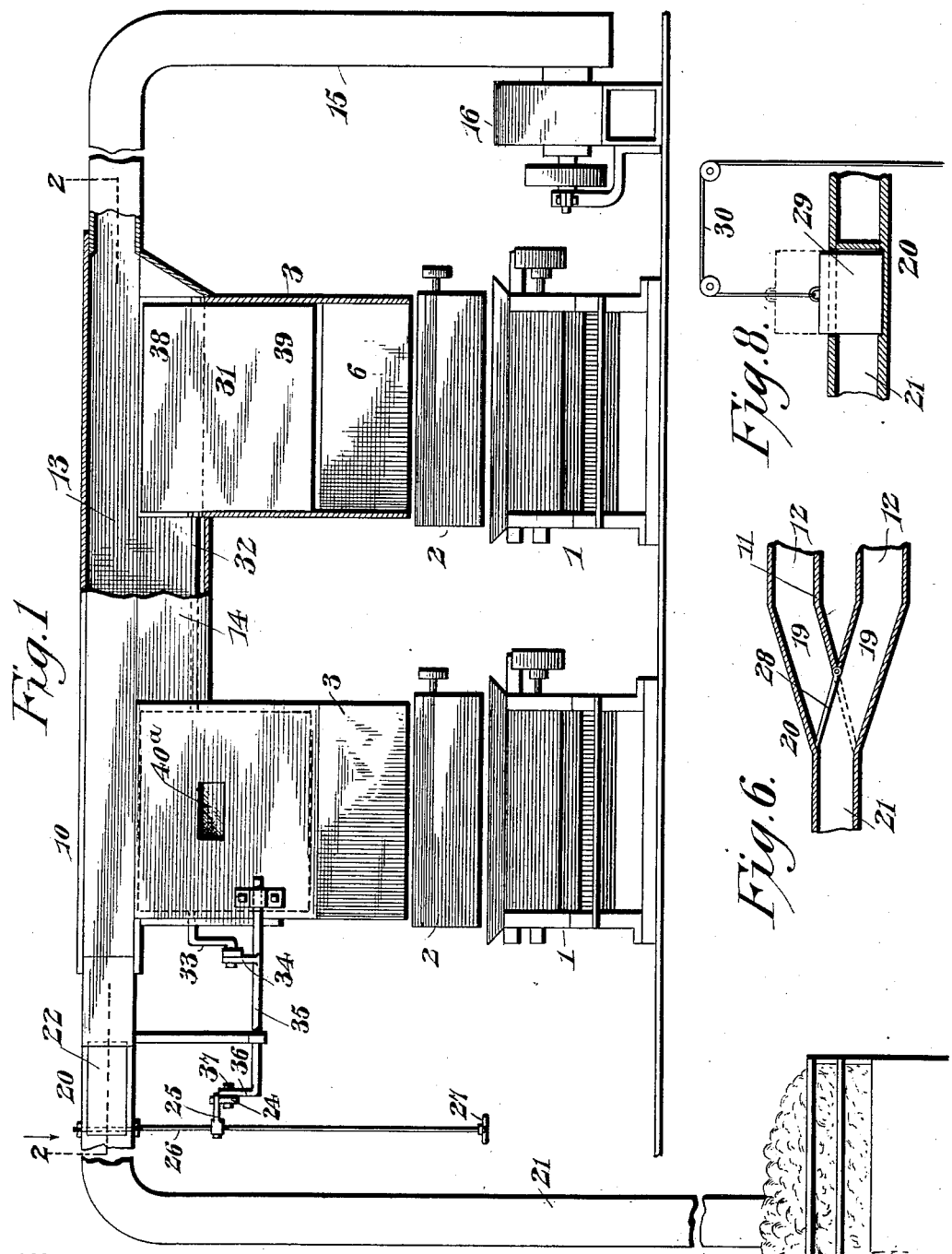

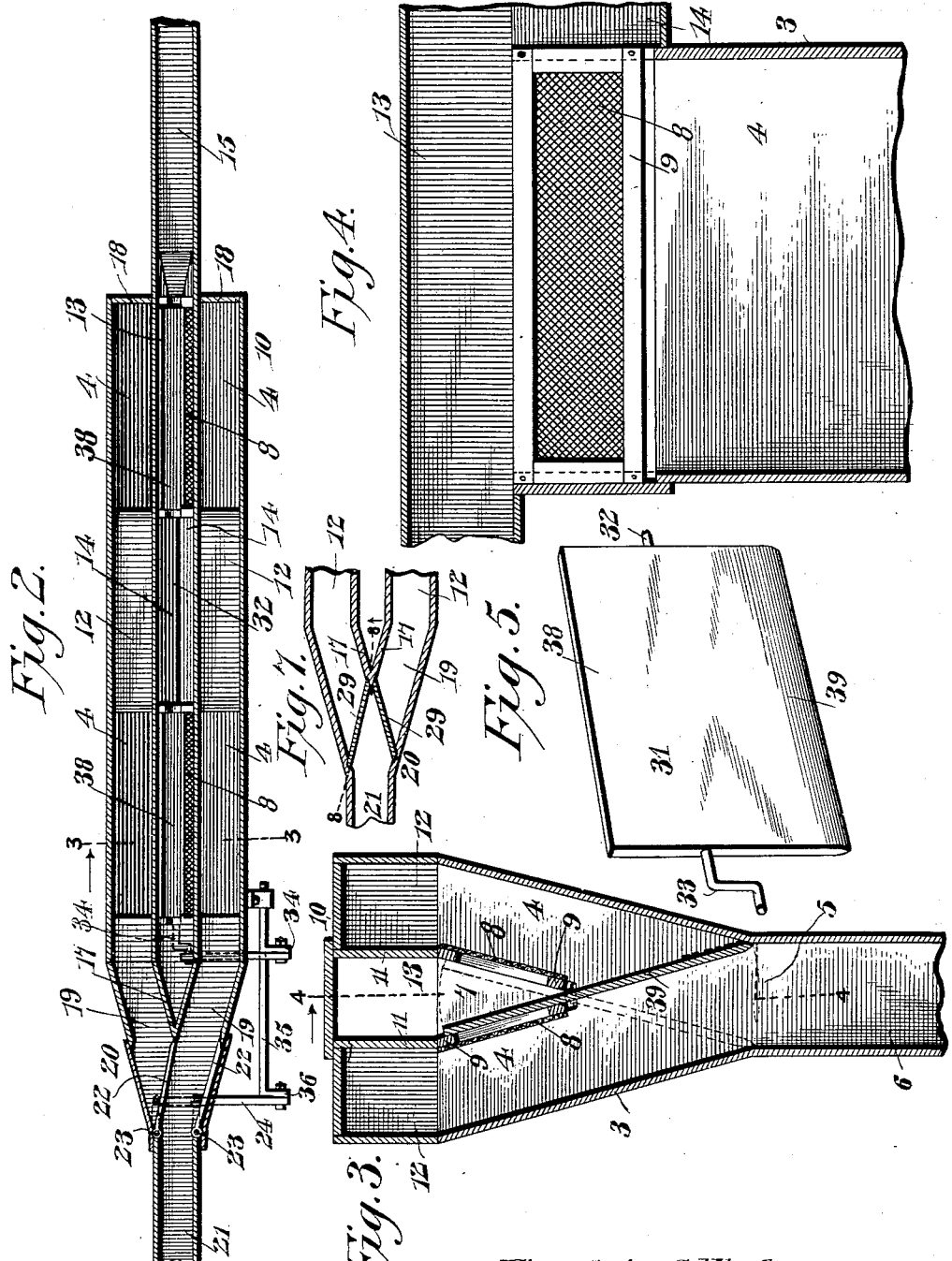

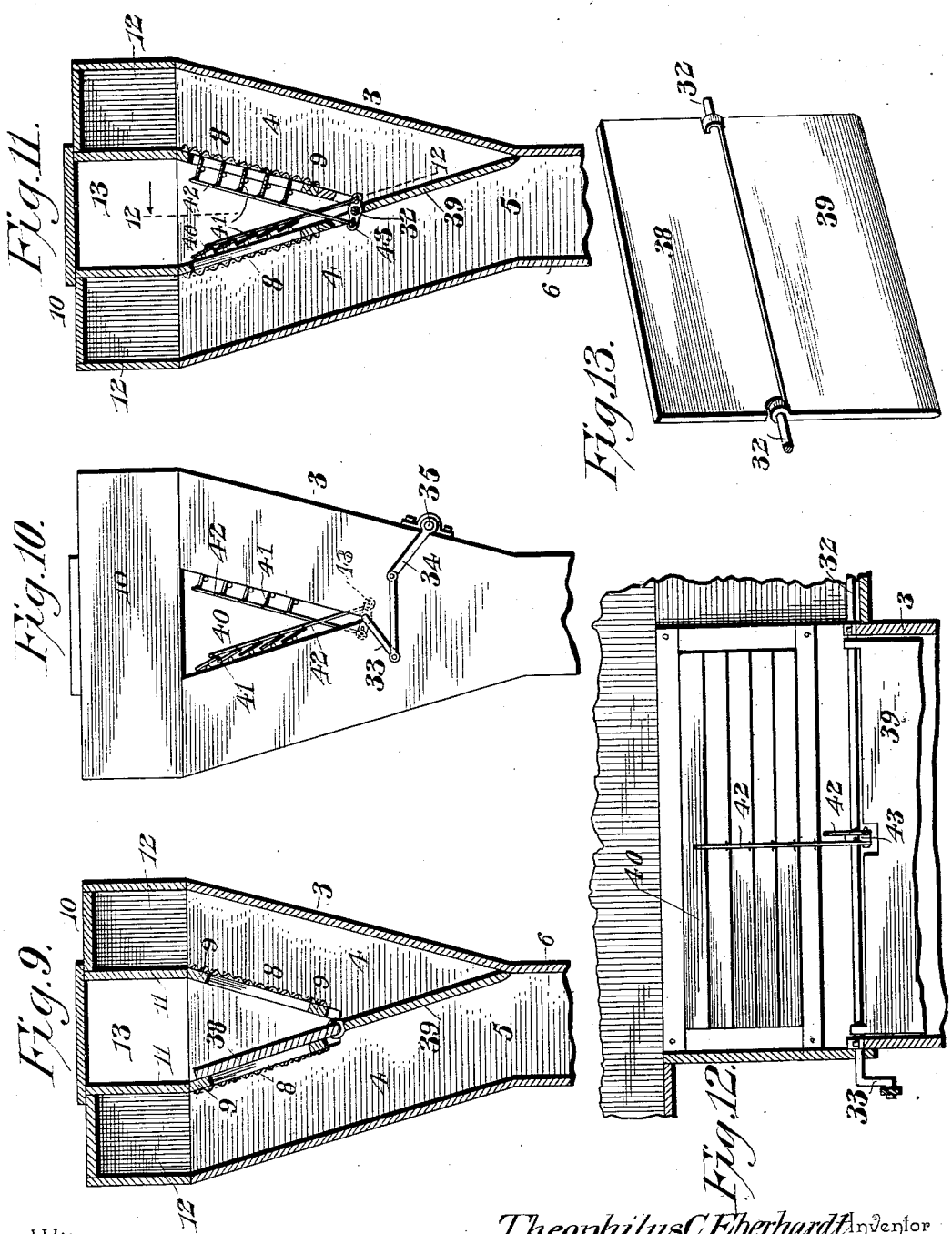

THEOPHILUS C. EBERHARDT, OF PRATTVILLE, ALABAMA.

PNEUMATIC COTTON ELEVATOR AND DISTRIBUTER.

SPECIFICATION forming part of Letters Patent No. 655,299, dated August 7, 1900.

Application filed January 4, 1899. Serial No. 701,146. (No model.)

*To all whom it may concern:*

Be it known that I, THEOPHILUS C. EBERHARDT, a citizen of the United States, residing at Prattville, in the county of Autauga and State of Alabama, have invented a new and useful Pneumatic Cotton Elevator and Distributer, of which the following is a specification.

My invention relates to improvements in that class of seed-cotton elevators and cleaners in which the cotton is elevated by atmospheric suction and is discharged automatically by gravity from its receptacle by diverting the air-current into a different channel through the medium of deflecting-valves in the cotton-receptacle.

One object of the invention is to provide a mechanism whereby the flow of cotton through the pipe or flue leading to the cotton-receptacle or feeder-chute is not only continuous, but the delivery of cotton into said feeder chute or receptacle, as well as the discharge of cotton from its discharge-opening, is also continuous.

Heretofore in the operation of many of the ordinary types of pneumatic apparatus for conveying seed-cotton from a source of supply and distributing the same to the cotton-gin feeders it is the practice to interpose an air-cut-off valve in the line of piping or flues somewhere between the exhaust-fan and the series of feeder-chutes or vacuum-boxes, which valve is operated manually or automatically at fixed intervals corresponding to the time required to fill the cotton-receiving chutes or boxes. This valve or equivalent device that is used in connection with the ordinary apparatus does not interfere with the action of the exhaust-fan—that is, does not require the stoppage of the fan—but breaks or interrupts the suction throughout the apparatus, including the suction-supply pipe for the cotton, thereby necessarily stopping the feed of the cotton and allowing the same in the vertical portions of the supply or feed pipe to fall back. When the valve or equivalent device is again opened, the entire feed of cotton is again started; but in this operation the interval of interruption in the feed of the cotton through the suction-supply pipe not only interferes with the even distribution of the cotton to the several gin-stands, but in the aggregate involves an appreciable loss of time that might be utilized in the continuous feed of the cotton. In other devices of this class heretofore in use for feeding a plurality of gins with cotton it has been necessary to arrange the gins into sets and to feed the sets of gins alternately and intermittenty, thereby materially interfering with the work thereof.

A further object of the present invention is to provide a simple, cheap, and effective means for feeding the cotton continuously and simultaneously to a plurality of gins arranged and connected in one common series, although the improvements of my invention are susceptible of use to good advantage in connection with a single gin-stand.

With these and other objects in view, which will readily appear as the nature of the invention is better understood, the same consists in the novel construction, combination, and arrangement of parts hereinafter more fully described, illustrated, and claimed.

While the fundamental and essential features of the apparatus are necessarily susceptible to a variety of modifications, still the preferred embodiment of the invention is shown in the accompanying drawings, in which—

Figure 1 is a side elevation, partly in section, of a pneumatic cotton elevator and distributer constructed in accordance with the present invention and shown in its operative relation to a plurality of gin-stands. Fig. 2 is a horizontal longitudinal sectional view of the distributing-flue conveyer, the line of section being on the line 2 2 of Fig. 1. Fig. 3 is a vertical sectional view through one of the feeder-chutes or vacuum-boxes on the line 3 3 of Fig. 2. Fig. 4 is a detail longitudinal sectional view on the line 4 4 of Fig. 3. Fig. 5 is a detail in perspective of the simple form of oscillatory valve-vane, forming a combined suction-controlling and chute-cut-off valve. Fig. 6 is a detail sectional view of the distributing-Y for the cotton-flues, showing a modified form of deflecting-valve. Fig. 7 is a view similar to Fig. 6, showing another type of deflecting-valve for the distributing-Y. Fig. 8 is a detail sectional view on the line 8 8 of Fig. 7. Fig. 9 is a vertical sectional view of the feeder-chute or vacuum-box, showing a modified arrangement of the suction-controlling and chute-cut-off valves. Figs. 10 and 11 are elevation and sectional views, respectively, of a feeder-chute, showing a modified type of suction-controlling valve for the suction or valve chamber of the chute. Fig. 12 is a detail sectional view on the line 12 12 of Fig. 11. Fig. 13 is a detail in perspective of the arrangement of suction-controlling and chute-cut-off valves shown in Fig. 9 of the drawings.

Referring to the accompanying drawings, the numerals 1 1 designate a plurality of ordinary gin-stands that are arranged on the floor of a ginnery in the usual location and are properly alined to facilitate the feeding of the several stands simultaneously, and each of said gin-stands 1 is equipped with the usual gin-feeder 2, arranged directly thereabove. The present invention contemplates an apparatus which provides for elevating the cotton from a common source of supply and not only cleaning the same, but evenly distributing it simultaneously to the several gins, and to provide for carrying out this operation there is arranged above each gin-stand and its feeder a vertically-disposed feeder-chute 3. The feeder-chute 3, sometimes termed in the art a "vacuum or cotton box," is constructed approximately of a Y shape and is formed with a pair of separate downwardly-convergent cotton-passages 4, open at their upper ends and merging at their lower ends into a common discharge-opening 5, from which is preferably extended a delivery-spout 6, which acts in the capacity of a former to provide for contracting the cotton into a bat that is evenly delivered to the gin-feeder; but it will of course be understood that in the event of the apparatus being employed for depositing the cotton into separate stalls or bins the extended delivery-spout 6 may be omitted, as the essential feature of the construction is the pair of downwardly-convergent passages 4 merging into a common outlet or discharge for the cotton.

In addition to the separate downwardly-convergent passages 4 each feeder-chute 3 is provided at its upper end and between the upper portions of the passages 4 with a centrally-located substantially V-shaped suction or valve chamber 7, open at the top and inclosed at its sides by the oppositely-located separating-screens 8. The oppositely-located separating-screens 8 are converged in a downward direction and are preferably fitted to the sides of rectangular screen-frames 9, which serve to close in the bottom of the suction or valve chamber by reason of their convergence, while at the same time forming valve-seats, as will be hereinafter more fully explained.

The open upper ends of the several feeder-chutes 3 (there being a number of such chutes corresponding in number to the gin-stands) are covered by and in communication with a horizontal distributing-flue conveyer 10, which is of a sufficient length to connect the entire series of feeder-chutes, only two of which are shown in the drawings for the purposes of illustration. The horizontal flue-conveyer 10, which connects the separate feeder-chutes 3, is provided with a plurality of longitudinal parallel partitions 11, which form the interior of the conveyer into a pair of parallel oppositely-located cotton-flues 12 and an intermediate air-suction flue 13, which is arranged between the two cotton-flues 12, and has no lateral communication therewith. The two cotton-flues 12 and the central or intermediate air-flues 13 are entirely inclosed except at the bottom, and the said cotton-flues 12 open directly into the separate cotton-passages 4 of the feeder-chutes, while the open-bottom air-suction flue is arranged in vertical alinement and in direct communication with the centrally-located suction or valve chamber 7 of the feeder-chutes, as plainly shown in Figs. 2 and 3 of the drawings.

The intermediate air-suction flue 13 of the distributing-conveyer has the bottom portion thereof between the separate feeder-chutes covered by a V-shaped leg 14, which insures a direct communication between the V-shaped suction or valve chamber 7 of the chutes, and at one end the said air-suction flue has coupled thereto one end of the exhaust-pipe 15, the other end of which pipe connects with an ordinary exhaust or suction fan 16, which during the operation of the apparatus is continuously active to provide for maintaining a constant suction throughout the entire line of piping and flues. At the end opposite its connection with the exhaust-pipe the intermediate air-suction flue 13 is closed, as indicated at 17, and said side cotton-flues 12 at their terminals next to the exhaust-pipe 15 are provided with closed ends 18, while the opposite ends of said cotton-flues are open and communicate, respectively, with the separate branches or legs 19 of a cotton-distributing Y-coupling 20, fitted in any suitable manner to one end of the flue-conveyer 10, so as to communicate with the side cotton-flues 12. The Y-coupling 20 has connected to the receiving end thereof one end of the suction-supply pipe 21, the other end of which pipe leads to the wagon or other single source of supply of seed-cotton, whereby the cotton is drawn through said pipe from a single source of supply and deflected through either branch or leg 19 of the distributing-Y into either of the side cotton-flues 12.

The deflection of the cotton from the common supply-pipe 21 through either of the separate branches 19 of the distributing-Y may be accomplished through the medium of any suitable deflector or valve, several types of which are shown, respectively, in Figs. 2, 6, 7, and 8 of the drawings. The preferable type of deflector is shown in Figs. 1 and 2 of the drawings, and this consists, essentially, of a pair of parallel deflecting-valves 22, pivoted at one end, as at 23, respectively, at opposite sides of the inlet-opening for the Y- coupling and having their free ends playing across the contiguous ends of the branches or legs 19, so as to aline with the side walls of either of said branches or legs and form a complete passage-way into either of the side cotton-flues 12, as plainly shown in Fig. 2 of the drawings. The said deflecting-valves may be preferably connected together for simultaneous movement by a connecting-bar 24, pivotally connected to rock-arms 25, mounted on the valve-stems 26, extended from and forming the pivots for the valves, and one or both of the valve-stems may be extended into an operating-handle 27, which is under the ready control of the attendant to provide for manually shifting the deflecting-valves 22.

While the construction referred to constitutes the preferred means for deflecting the cotton through either branch or leg of the Y-coupling, the expedients shown in Figs. 6, 7, and 8 of the drawings might also be resorted to. In the modification shown in Fig. 6 a single pivotal deflecting-valve 28 is employed, which is pivoted in a plane centrally between the two branches or legs 19 and is adapted to have the free end thereof swung to either side of the inlet-opening for the Y. In the modification shown in Figs. 7 and 8 of the drawings a separate slide-valve 29 is arranged transversely of each of the branches or legs 19 and may be conveniently raised or lowered through the medium of suitable operating cords or wires 30. The modifications of Figs. 6, 7, and 8 are simply illustrated and described to show that I might resort to different expedients other than the construction shown in Fig. 2 for deflecting the cotton into either of the side cotton-flues 12.

To provide for properly controlling the suction within each feeder-chute or vacuum-box 3 and also for holding the cotton in either of the cotton-passages 4 until such passage is filled and ready to be emptied, there is employed a suction-controlling valve as well as a chute-cut-off valve, and in the simple form of the invention these valves are combined in a single oscillatory valve-vane 31, hung upon a horizontal valve-shaft 32, which extends across the several feeder-chutes and connects the valves thereof for movement in unison. The said valve-shaft is provided at one end with a crank 33, which connects with a rock-arm 34 of a rock-shaft 35, supported in suitable bearings and provided at one end with a terminal rock-arm 36, pivotally connected at 37 with the operating connections for moving the two deflecting-valves 22 in unison, thereby completing a simple form of operating mechanism, whereby the deflecting-valves for the distributing-Y and the controlling and cut-off valves for the feeder-chute may be operated simultaneously by hand, although this result may be accomplished in other ways without departing from the spirit or scope of the present invention, as I lay no special claim in this application to any specific means for simultaneously controlling the deflecting-valves of the distributing-Y and the valves of the feeder-chutes.

Referring particularly to the single oscillatory valve-vane 31, it will be observed that the same is mounted eccentrically on the valve-shaft 32, so that the lower portion thereof will assist in overbalancing the upper portion above the valve-shaft, thereby reducing the pressure, which must be overcome in moving such upper portion of the valve-vane from one separating-screen to the other. The said upper portion of the oscillatory valve-vane above the shaft constitutes a suction-controlling valve 38, which is arranged for swinging movement within the suction or valve chamber 7 of the feeder-chute between the oppositely-located side screens 8 of such chamber, and at this point it will be observed that the rectangular screen-frames 9 provide valve-seats upon which the valve 38 closely fits. In the form of valve described the oscillatory valve-vane 31 is hung on its shaft at the bottom or apex of the suction or valve chamber 7, so that the upper suction-controlling valve 38 projects into said chamber, while the lower portion of the vane works within the lower part of the feed-chute 3 and constitutes a chute-cut-off valve 39, which moves from side to side of the outlet or discharge at the bottom of the feeder-chute and alternately closes in the lower end of one passage 4 and opens up and forms one of the walls of the other passage.

In the operation of the apparatus with the section-controlling and chute-cut-off valves combined in a single vane it will be understood by reference to Fig. 3 of the drawings that when the lower chute-cut-off valve 39 closes in the lower portion of one of the passages 4 the upper suction-controlling valve 38 covers the separating-screen 8 for the other passage 4. This places the suction within the passage 4, which is closed by the cut-off valve 39, by permitting the air to freely pass through the separating-screen 8 for this passage. With the valves thus positioned the cotton is drawn into the closed passage 4, and the air and dirt pass through the separating-screen 8 for such passage into the air-suction flues 13 and thence to the exhaust pipe and fan. Now when the closed passage 4 of the feeder-chutes becomes filled with its supply of cotton, which may be determined by inspection through suitable windows $40^a$, placed in the sides of the feeder-chutes, the valve-controlling mechanism is actuated to provide for simultaneously deflecting the feed of cotton into the side cotton-flue 12, previously inactive, and also oscillating the valve-vane, so as to open up the passage 4, filled with cotton, and cut off the draft through the screen for such passage and open up the suction through the opposite screen, so that while the cotton is discharging from the previously-filled passage 4 the suction is drawing in a supply of cotton into the other passage 4. This operation continues alternately, so that at all times one of the passages 4 in the feeder-chutes is receiving its supply of cotton, thereby permitting a continuous operation of the exhaust-fan and a continuous feeding of the cotton through the suction-supply pipe 21 under the impulse of the suction induced by the fan.

While suction within the separate passages of the feeder-chute and the discharge of the cotton therefrom may be controlled in certain cases by the use of a single oscillatory valve-vane 31, I regard it more practical to employ the modified form of valve shown in Figs. 9 and 13 of the drawings. In this construction the upper suction-controlling valve 38 and the lower chute-cut-off valve 39 are separate and independent, but are hung from the same valve-shaft 32, arranged in the location and operated in the manner previously described; but the valve 38 is made fast to the shaft 32, so as to move therewith, while the valve 39 is hung loosely therefrom, so as to be influenced solely by the suction within the passages 4 of the feeder-chute. With the construction of valves shown in Figs. 9 and 13 of the drawings the same operation previously described is carried out; but it will be observed that it is only necessary for the actuating mechanism to mechanically shift the suction-controlling valve 38, as when the suction is cut off from one of the passages 4 of the feeder-chute the cut-off valve 39 is free to swing across the chute and be drawn by the suction in the other passage to a position for closing the lower end of such passage. In other words, in the construction shown in Figs. 9 and 13 of the drawings the cut-off valve 39 is automatically shifted from side to side as the movement of the controlling-valve 38 shifts the suction from one passage 4 to the other; but in all other respects the operation is precisely the same as described in connection with the oscillatory valve-vane 31.

As it is preferable to permit the lower chute-cut-off valve 39 to freely swing from the valve-shaft 32, so as to be shifted from side to side of the feeder-chute by the suction, it is obvious that modifications of the upper suction-controlling valve may be resorted to, and the preferred modification is shown in Figs. 10 and 11 of the drawings. In this modification in place of an oscillatory suction-controlling valve 38 there is employed within the suction or valve chamber 7 over each of the screened openings a shutter-valve 40, comprising a plurality of pivotal valve-slats 41, pivotally connected together by a common adjusting-rod 42, which provides for turning the slats on their axes to open and close the same. The adjusting-rods 42 for the oppositely-located shutter-valves are respectively connected at one end to opposite extremities of a cross-arm 43, fitted to the valve-shaft 32, so that by an oscillation of such shaft the separate adjusting-rods 42 will be respectively reciprocated in opposite directions, whereby the slats of one shutter-valve would be turned to a closed position simultaneously with the turning of the slats of the other valve to an open position. This construction therefore provides for alternately shifting the suction from one cotton-passage 4 to the other, and thereby carrying out the continuous-feeding operation hereinbefore described.

One of the important features of a seed-cotton-handling apparatus of my invention resides in the means by which the cotton is elevated by the suction of an exhaust-fan and delivered continuously to one and the same feeder-chute and gin, and in cases where a battery consisting of a number of gins arranged in the same series is employed, as represented by the drawings, each and all of the gins constituting such battery will be fed simultaneously, so that it is not necessary to divide the battery of gins into sets, as has been proposed heretofore in this art. It is to be understood that my seed-cotton-handling apparatus attains two important functions—first, the pneumatic conveyer delivers the seed-cotton continuously to one gin as well as to a series of gins, and, second, it is not necessary to arrange the gins of a battery in sets and to feed said sets of gins alternately, but, on the contrary, the feeding to each and every gin in the battery will be continuous and simultaneous. Hence a continuous flow and delivery of seed-cotton to each gin, with a simultaneous distribution to two or more gins of a battery, is effected by the apparatus of my invention.

While I have described specific actuating means for the valves and different modifications of the valves themselves, it will be understood that the present invention is not restricted to the same, but is susceptible to all modifications that involve a feeder-chute having a series of cotton-passages which communicate with a common outlet forming a single point of discharge with which mechanism, substantially as heretofore set forth, operates for delivering the cotton successively to the said passages of the said feeder-chute and all in combination with a gin-stand, whereby cotton may be supplied continuously to the latter. It will therefore be understood that various changes in the form, proportion, and the minor details of construction may be resorted to without departing from the principle or sacrificing any of the advantages of this invention.

Having thus described the invention, what is claimed, and desired to be secured by Letters Patent, is—

1. In a cotton-handling apparatus, a feeder-chute having a series of cotton-passages which communicate with a common outlet forming a single point of discharge, combined with mechanism substantially as described for delivering cotton successively to the passages of said feeder-chute, and a gin-stand, whereby cotton may be supplied continuously to said gin-stand, substantially as set forth.

2. In a cotton-handling apparatus, a feeder-chute having a series of cotton-passages which communicate with a common outlet, and a valve mechanism for closing one passage and opening another passage, combined with a gin-stand, and mechanism substantially as described for delivering cotton successively to the passages of said feeder-chute, substantially as described.

3. In a cotton-handling apparatus, a pneumatic conveyer, a gin, a longitudinally-divided feeder-chute between the gin and the conveyer and provided with a series of cotton-passages which communicate with a common outlet serving as a single point of discharge from the individual passages to the gin, and shiftable controlling devices substantially as described for causing an accumulation of cotton in one passage of the feeder-chute and at the same time opening the other passage of the feeder-chute to communication with the gin, said controlling devices being shiftable to alternately establish communication from the individual feeder-passages with the same gin, as and for the purposes described.

4. In a cotton-handling apparatus, a longitudinally-divided feeder-chute having individual cotton-passages communicating with a single outlet, and a valve for closing one passage and opening the other passage of said chute to the accumulation of cotton therein, combined with a conveyer having means for delivering cotton alternately into the individual passages of the chute, and means for continuously feeding cotton to said conveyer, substantially as described.

5. In a pneumatic cotton-handling apparatus, the combination of a divided feeder-chute having individual passages communicating with a common outlet, a valve mechanism in said feeder-chute to alternately close communication between said outlet and the passages, a longitudinally-divided pneumatic conveyer having isolated passages in communication with the cotton-passages of the divided feeder, means for supplying cotton alternately from the passages of said divided conveyer to the passages of the feeder, and a single suction-supply pipe communicating with said conveyer, substantially as described.

6. In a pneumatic cotton-handling apparatus, the combination of a divided feeder-chute having a pair of separate passages communicating with a common outlet, a pneumatic conveyer divided longitudinally into separate cotton-flues which communicate respectively with said separate passages of the chute, a valve in the feeder-chute serving to alternately close the cotton-passages therein and simultaneously change the course of a suction-current through the cotton-flues of the divided conveyer, a single exhaust-pipe connected with said conveyer for maintaining a continuous suction throughout the apparatus, and a single suction-supply pipe connected with the conveyer for feeding cotton to either of the cotton-flues thereof, substantially as set forth.

7. In a pneumatic cotton-handling apparatus, the combination of a divided feeder-chute having a pair of separate passages communicating with an outlet forming a common point of discharge to a gin, a pneumatic conveyer divided longitudinally into cotton-flues, communicating respectively with said separate passages of the divided feeder-chute, and also provided with a supplemental air-suction flue, having communication with both passages of the pneumatic conveyer, a suction-controlling valve for shifting the suction from one cotton-passage to the other of said pneumatic conveyer, a single exhaust-pipe communicating with said air-suction flue of the conveyer, and means for feeding cotton from a single source of supply to either of said cotton-flues of said pneumatic conveyer, substantially as set forth.

8. In a pneumatic cotton-handling apparatus, the combination of a divided feeder-chute having a pair of separate passages communicating with an outlet forming a single point of discharge to a gin, a pneumatic conveyer divided longitudinally into a pair of separate cotton-flues, communicating respectively with the separate passages of the divided feeder-chute, and also provided with an air-suction flue, which communicates with both passages of the divided feeder-chute, means for shifting the suction from one passage to the other of said divided conveyer and also for permitting the cotton to accumulate alternately in the separate passages of the divided feeder-chute, an exhaust-pipe connected with said air-suction flue of the pneumatic conveyer, and a suction-supply pipe having means for delivering the cotton into either cotton-flue of the divided conveyer, substantially as set forth.

9. In a pneumatic cotton-handling apparatus, the combination of a divided feeder-chute having a pair of separate passages communicating with a common outlet forming a single point of discharge to a gin, a pneumatic conveyer divided longitudinally into a plurality of flues, two of said flues forming cotton-flues which communicate respectively with the separate passages of the chute and another flue forming an air-suction flue having communication with both passages of said divided chute, means for shifting the suction from one passage to the other of the pneumatic conveyer and also permitting the cotton to accumulate alternately in the separate passages of the feeder-chute, an exhaust-pipe connection with the air-suction flue, a single suction-supply pipe having separate branches communicating respectively with the separate cotton-flues, and a shiftable device for deflecting the course of the cotton through either of said branches, substantially as set forth.

10. In a pneumatic cotton-handling apparatus, the combination of a divided feeder-chute having a pair of separate passages communicating with a common outlet forming a single point of discharge to a gin, a pneumatic conveyer divided longitudinally to form the individual cotton-flues, communicating respectively with the separate passages of the chute, and an intermediate air-suction flue, the latter being located between the side cotton-flues and having communication with both passages of the chute, means for shifting the suction from one cotton-passage to the other of the divided conveyer and also permitting the cotton to accumulate alternately in the separate passages of the conveyer and feeder-chute, a single suction-supply pipe having a distributing Y connection with the individual cotton-flues only of the conveyer, and a deflecting valve or valves mounted in said distributing Y connection of the suction-pipe, substantially as set forth.

11. In a pneumatic cotton-handling apparatus, the combination of a divided feeder-chute having a pair of separate passages communicating with a common outlet forming a single point of discharge to a gin, a pneumatic conveyer covering the top of the chute and divided into a series of three open-bottom flues, the side flues constituting cotton-passages in connection with the individual passages of the chute and the intermediate flue forming a suction-passage, a suction-controlling and cut-off valve for the feeder-chute, an exhaust-pipe connection with the suction passage or flue of the conveyer, and a suction-supply pipe having a valved distributing Y connection with the cotton-flues of the conveyer, substantially as set forth.

12. In a pneumatic cotton-handling apparatus, the combination of a divided feeder-chute having a pair of separate passages communicating with a common outlet forming a single point of discharge to a gin, a pneumatic conveyer divided longitudinally into side cotton-flues, communicating respectively with the separate passages of the chute, and an air-suction flue having communication with both passages of said divided chute, a suction-controlling and cut-off valve supported by the feeder-chute to close the passages alternately and simultaneously change the course of the suction-current in the cotton-passages of the divided pneumatic conveyer, an exhaust-pipe communicating at all times with the air-flue of said divided conveyer, a suction-supply pipe having separate distributing branches connected respectively with the separate cotton-flues of the conveyer, a deflector in said branched supply-pipe for directing the cotton into either of the cotton-flues, and mechanism for simultaneously actuating the deflector and the suction-controlling valve, substantially as set forth.

13. In a pneumatic cotton-handling apparatus, the combination of a divided feeder-chute having a pair of separate passages communicating with a common outlet forming a single point of discharge to a gin, and a suction-chamber arranged between said passages and having screened openings at opposite sides which are in communication with the individual passages of the feeder-chute, a pneumatic conveyer having cotton-flues, communicating respectively with the separate passages of the chute, and a single air-suction flue, communicating with said suction-chamber of the feeder-chute, means for alternately covering and uncovering the screened side openings of the suction-chamber, a cut-off valve hung in the feeder-chute below the suction-chamber and adjusted to alternately close the separate passages of said chute, and means for feeding cotton from a common source of supply alternately into the separate cotton-flues of the divided conveyer, substantially as set forth.

14. In a pneumatic cotton-handling apparatus, a feeder-chute having a pair of separate passages communicating with a common outlet, and a suction-chamber arranged between such passages and having screened side openings communicating therewith, a pneumatic conveyer having a pair of open-bottom cotton-flues arranged over the upper ends of said separate passages, and a single open-bottom air-suction flue arranged over and communicating with the said suction-chamber, a single exhaust-pipe connection with said air-suction flue, a single suction-supply pipe having branch connections with the cotton-flues, means for alternately covering and uncovering the screened side openings of the suction-chamber, and a cut-off valve operating within the lower part of the chute to alternately close the separate passages thereof, substantially as set forth.

15. In a pneumatic cotton-handling apparatus, a feeder-chute having a pair of separate cotton-passages communicating with a common outlet, and a suction-chamber arranged between such passages and having screened side openings communicating therewith, a pneumatic conveyer having a pair of cotton-flues opening into said separate passages, and a single air-suction flue opening into said suction-chamber, an exhaust-pipe connection with the air-suction flue, a suction-supply pipe having branch connections with the cotton-flues, a shutter-valve arranged over each of the screened side openings of the suction-chamber, and an oscillatory cut-off valve hung at the apex of the suction-chamber, substantially as set forth.

16. In a pneumatic cotton-handling apparatus, a feeder having a pair of separate cotton-passages communicating with a common outlet, and a suction-chamber arranged between such passages and having screened side openings communicating therewith, a pneumatic conveyer having separate cotton-flues opening respectively into said separate passages, and a single air-suction flue opening into said suction-chamber, an exhaust-pipe connection with the air-suction flue, a suction-supply pipe having a deflecting device for deflecting the cotton into either of said cotton-flues, a valve-shaft arranged at the bottom of the suction-chamber, a shutter-valve arranged over each of the screened side openings of the suction-chamber, and having adjusting connections with the valve-shaft, an oscillatory suction-controlled valve loosely hung from said valve-shaft and capable of swinging from side to side of the chute, and means for simultaneously operating the valve-shaft and the deflecting device of the suction-supply pipe, substantially as set forth.

In testimony that I claim the foregoing as my own I have hereto affixed my signature in the presence of two witnesses.

THEOPHILUS C. EBERHARDT.

Witnesses:
JOHN H. SIGGERS,
HAROLD H. SIMMS.